United States Patent
Cho et al.

(10) Patent No.: US 10,046,642 B2
(45) Date of Patent: Aug. 14, 2018

(54) CONTROL METHOD OF DUAL CLUTCH TRANSMISSION FOR HYBRID ELECTRIC VEHICLE AND CONTROL SYSTEM FOR THE SAME

(71) Applicants: HYUNDAI MOTOR COMPANY, Seoul (KR); KIA MOTORS CORPORATION, Seoul (KR)

(72) Inventors: Sung Hyun Cho, Yongin-si (KR); Young Jun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 201 days.

(21) Appl. No.: 15/056,742

(22) Filed: Feb. 29, 2016

(65) Prior Publication Data
US 2017/0096069 A1    Apr. 6, 2017

(30) Foreign Application Priority Data

Oct. 1, 2015  (KR) .......................... 10-2015-0138554

(51) Int. Cl.
*G06F 19/00* (2018.01)
*B60W 20/00* (2016.01)
(Continued)

(52) U.S. Cl.
CPC ............. *B60L 7/18* (2013.01); *B60L 15/2054* (2013.01); *B60W 10/08* (2013.01); *B60W 20/00* (2013.01);
(Continued)

(58) Field of Classification Search
None
See application file for complete search history.

(56) References Cited

U.S. PATENT DOCUMENTS

| 2004/0038776 A1* | 2/2004 | Kuhstrebe | B60K 6/485 |
| | | | 477/77 |
| 2009/0149295 A1* | 6/2009 | Yamamoto | B60K 6/48 |
| | | | 477/109 |

(Continued)

FOREIGN PATENT DOCUMENTS

| KR | 10-2011-0054470 A | 5/2011 |
| KR | 10-2012-0082605 A | 7/2012 |

(Continued)

OTHER PUBLICATIONS

Korean Notice of Allowance dated Feb. 9, 2017 issued in Korean Patent Application No. 10-2015-0138554.

*Primary Examiner* — Thomas G Black
*Assistant Examiner* — Demetra R Smith-Stewart
(74) *Attorney, Agent, or Firm* — McDermott Will & Emery LLP (57) ABSTRACT

A control method of a dual clutch transmission for a hybrid electric vehicle includes: determining, by a transmission controller, whether a vehicle has entered a power-off down-shift state; determining, by the transmission controller, whether a transmission including a first input shaft, a second input shaft, and an output shaft has entered a torque phase, when the first determining step determines that the vehicle has entered the power-off down-shift state; calculating a compensatory torque for compensating for a change in a regenerative braking force according to a change of a gear ratio in accordance with a completion percentage of the torque phase, when it is determined that a transmission has entered the torque phase; and compensating for regenerative torque of a motor by applying the compensatory torque.

11 Claims, 3 Drawing Sheets

(51) Int. Cl.

| | |
|---|---|
| *B60W 10/02* | (2006.01) |
| *B60L 7/18* | (2006.01) |
| *B60W 10/08* | (2006.01) |
| *B60W 30/18* | (2012.01) |
| *F16H 63/50* | (2006.01) |
| *B60L 15/20* | (2006.01) |

(52) U.S. Cl.
CPC ....... *B60W 30/18127* (2013.01); *F16H 63/50* (2013.01); *B60L 2240/423* (2013.01); *B60L 2240/486* (2013.01); *B60L 2240/507* (2013.01); *B60Y 2300/18125* (2013.01); *Y02T 10/76* (2013.01)

(56) References Cited

U.S. PATENT DOCUMENTS

| | | | |
|---|---|---|---|
| 2011/0118920 A1* | 5/2011 | Kim | B60K 6/48 |
| | | | 701/22 |
| 2013/0296100 A1 | 11/2013 | Nefcy et al. | |
| 2014/0131124 A1 | 5/2014 | Severinsky et al. | |
| 2015/0031503 A1* | 1/2015 | Isomura | B60W 10/113 |
| | | | 477/5 |
| 2015/0360676 A1* | 12/2015 | Nakano | B60K 6/547 |
| | | | 477/5 |

FOREIGN PATENT DOCUMENTS

| | | |
|---|---|---|
| KR | 10-2014-0048678 A | 4/2014 |
| KR | 10-1526433 B1 | 6/2015 |

\* cited by examiner

CONTROL METHOD OF DUAL CLUTCH TRANSMISSION FOR HYBRID ELECTRIC VEHICLE AND CONTROL SYSTEM FOR THE SAME

CROSS REFERENCE TO RELATED APPLICATION

The present application claims the benefit of priority to Korean Patent Application No. 10-2015-0138554, filed on Oct. 1, 2015, the entire content of which is incorporated herein for all purposes by this reference.

TECHNICAL FIELD

The present disclosure relates to a control method of a dual clutch transmission for a hybrid electric vehicle that effectively prevents reduction of braking linearity by power-off down-shift and efficiently increases shifting response in regenerative braking for charging a battery during braking, and a control system for the same.

BACKGROUND

Recently, eco-friendly vehicles, such as an electric vehicle and a hybrid vehicle, have been rapidly developed in response to concern about improvement of environment.

A hybrid vehicle means a vehicle equipped with a battery and a motor for a driving mode using electrical energy and an internal combustion engine for a driving mode like a common vehicle.

When a battery is used to drive a vehicle, such as a hybrid vehicle, various studies for improving efficiency of electrical energy consumption have been developed. Among them, regenerative braking for charging a battery with electrical energy produced by transmitting a braking force for deceleration to a motor has been developed.

In a power-off down-shift state in the regenerative braking of a hybrid vehicle, braking force by shifting and shifting response variously change in accordance with brake pedal effort, but it is difficult to maintain linearity of the braking force and shifting response, and thus, drivability deteriorates.

In particular, in a hybrid vehicle with a dual clutch transmission, braking ability and shifting response, which are considerably variously changed in a torque phase and an inertia phase during down-shift, are difficult to control.

The foregoing is intended merely to aid in the understanding of the background of the present invention, and is not intended to mean that the present invention falls within the purview of the related art that is already known to those skilled in the art.

SUMMARY

The present disclosure has been made keeping in mind the above problems occurring in the related art. An aspect of the present inventive concept provides a control method of a dual clutch transmission for a hybrid electric vehicle that effectively prevents reduction of linearity of braking by power-off down-shift and efficiently increases shifting response in regenerative braking, and a control system for the same.

According to an exemplary embodiment in the present disclosure, a control method of a dual clutch transmission for a hybrid electric vehicle includes: a first determining step of determining, by a transmission controller, whether the vehicle has entered a power-off down-shift state; a second determining step of determining, by the transmission controller, whether the transmission including a first input shaft, a second input shaft, and an output shaft has entered a torque phase, when the first determining step determines the vehicle has entered the power-off down-shift state; a calculating step of calculating, by a hybrid controller, a compensatory torque for compensating for a change in a regenerative braking force according to a change of a gear ratio in accordance with a completion percentage of the torque phase, when the second determining step determines that the transmission has entered the torque phase; and a compensating step of compensating for, by the hybrid controller, a regenerative torque of a motor by applying the compensatory torque calculated in the calculating step.

The compensatory torque may be obtained from a difference between an output torque of the output shaft and the regenerative braking force transmitted to the output shaft of the transmission due to the regenerative torque.

The output torque of the output shaft may be calculated based on a first torque from the first input shaft, a second torque from the second input shaft, a third torque from a first clutch engaged with the first input shaft, a fourth torque from a second clutch engaged with the second input shaft, a gear ratio between the first input shaft and the second input shaft, and the completion percentage of the torque phase.

A torque of the motor and a torque of the output shaft of the transmission may be converted into each other based on a gear ratio and a transmission efficiency of the first input shaft and the second input shaft.

The method may further include a third determining step of determining whether the transmission has entered an inertia phase, after the compensating step.

The method may further include a motor torque control step of controlling the motor with a motor torque calculated by applying a slip change rate according to a completion percentage of an inertia phase, when the third determining step determines that the transmission has entered the inertia phase.

In the motor torque control step, the motor torque may be calculated from a third torque from a first clutch, a fourth torque from a second clutch, a slip change rate, and a rotational speed change rate of an input shaft with which the motor is synchronized among the first and second input shafts.

In the motor torque control step, when a rotational speed of the motor is equal to a rotational speed of the input shaft which is synchronized with the motor, the control of motor torque may stop.

Whether a vehicle has entered the power-off down-shift state may be determined, whether the transmission has entered a torque phase may be determined, the compensatory torque may be calculated, and the regenerative torque of the motor may be compensated by the hybrid controller.

According to another exemplary embodiment in the present disclosure, a control system of a dual clutch transmission for a hybrid electric vehicle includes: the dual clutch transmission including a first input shaft, a second input shaft, and an output shaft; a motor selectively connected to clutches which are engaged with the first input shaft and the second input shaft, respectively, of the transmission; a transmission controller configured to determine whether the vehicle has entered a power-off down-shift state, determining whether the transmission has entered a torque phase, and calculating a compensatory torque for compensating for a change in a regenerative torque due to a gear ratio changed by the power-off down-shift state, in accordance with a completion percentage of the torque phase; and a hybrid controller configured to compensate for the regenerative torque by applying the compensatory torque.

According to the control method of a dual clutch transmission for a hybrid electric vehicle, and the control system for the dual clutch transmission, it is possible to effectively prevent reduction braking linearity due to power-off down-shift during regenerative braking and to efficiently improve shifting response.

In particular, when the transmission enters a torque phase by power-off down-shift during regenerative braking, it is possible to calculate a compensatory torque for compensating for a regenerative braking force and to efficiently maximize braking linearity of the vehicle by compensating for the regenerative torque.

Further, when the transmission enters an inertia phase by power-off down-shift during regenerative braking and a motor torque for synchronizing the rotational speed of a motor increases, it is possible to efficiently improve shifting ability and shifting response by controlling the motor torque for further improving shifting response.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinbelow, exemplary embodiments in the present disclosure will be described in detail with reference to the accompanying drawings.

Figure 1:
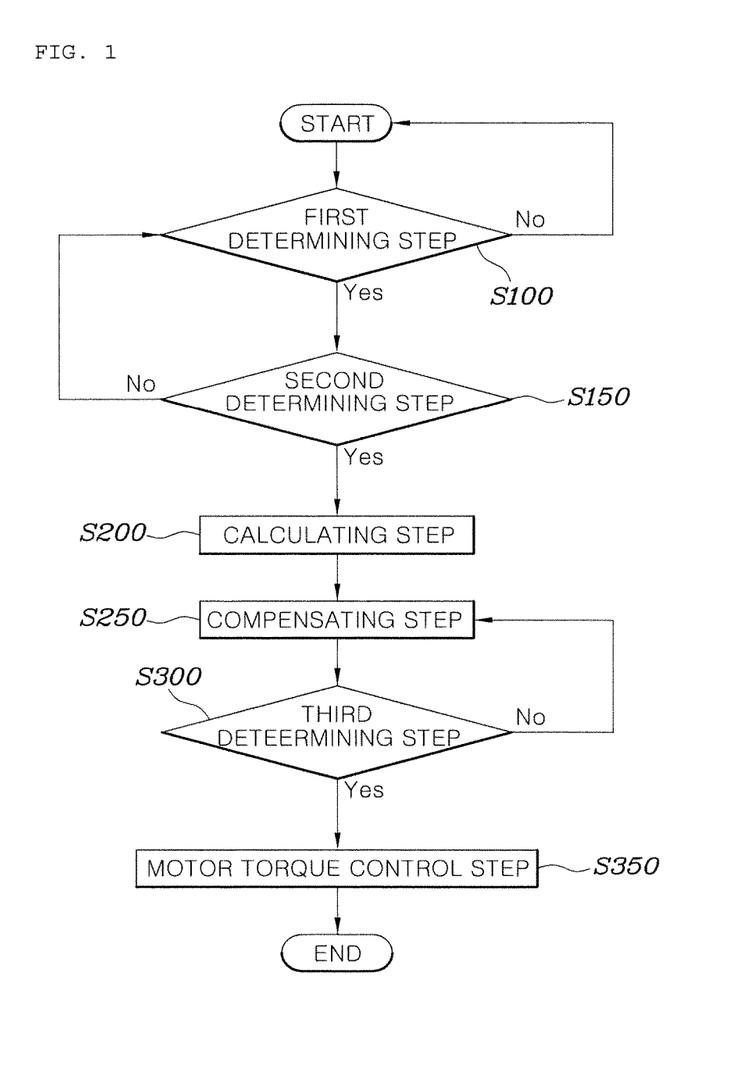
FIG. 1 is a flowchart illustrating a method of controlling a dual clutch transmission for a hybrid electric vehicle according to an embodiment in the present disclosure.
Figure 2:
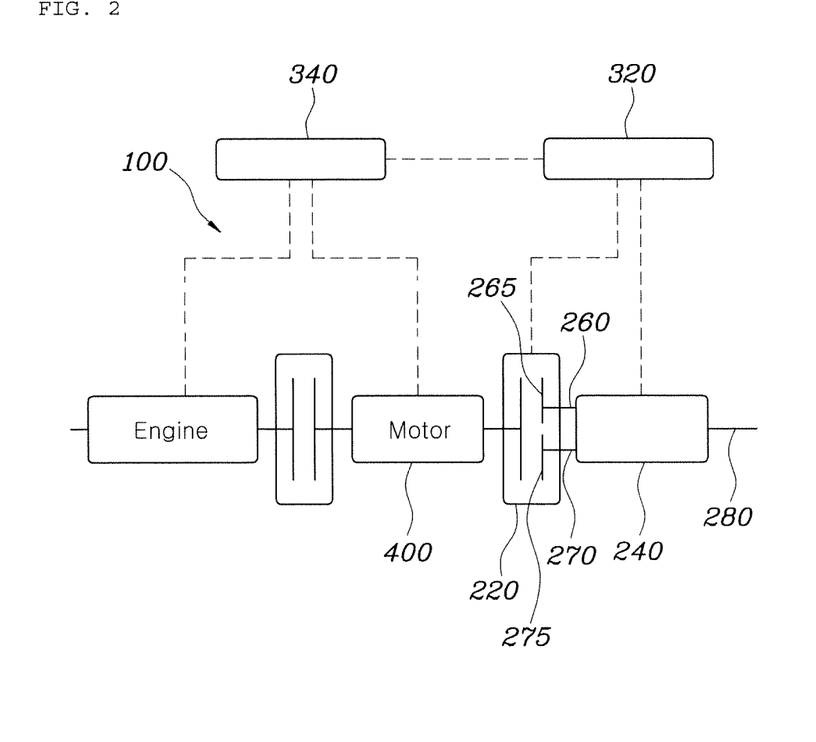
FIG. 2 is a diagram showing a control system of a dual clutch transmission for a hybrid electric vehicle according to an embodiment in the present disclosure.

Referring to FIGS. 1 and 2, a control method of a dual clutch transmission for a hybrid electric vehicle according to the present disclosure includes: a first determining step (S100) that determines, by a transmission controller, whether the vehicle has entered a power-off down-shift state; a second determining step (S150) that determines, by the transmission controller, whether the transmission including a first input shaft 260, a second input shaft 270, and an output shaft 280 has entered a torque phase, when the first determining step (S100) determines the vehicle has entered the power-off down-shift state; a calculating step (S200) that calculates, by a hybrid controller, a compensatory torque for compensating for a change in a regenerative braking force according to a change of a gear ratio in accordance with a completion percentage of the torque phase, when the second determining step (S150) determines that the transmission 240 has entered the torque phase; and a compensating step (S250) that compensates for, by the hybrid controller, a regenerative torque of a motor 400 by applying the compensatory torque calculated in the calculating step (S200).

In detail, the first determining step (S100) determines whether a vehicle has entered power-off down-shift state. The power-off down-shift state refers to a state in which shifting is performed from a current gear stage to a lower gear stage without power generation, for example, for braking a vehicle.

In a hybrid electric vehicle, when a brake signal is generated, regenerative braking can be performed for producing electrical energy by operating the motor 400 backward in response to a pedal effort by a driver, and the speed of the vehicle decreases by the regenerative braking, so power-off down-shift is made. In this process, a transmission controller 320 determines whether the power-off down-shift state has been entered.

When the first determining step (S100) determines that a vehicle is in a power-off down-shift state, the second determining step (S150) determines whether the transmission 240 has entered a torque phase.

The first input shaft 260, the second input shaft 270, and the output shaft 280 may be disposed in the transmission 240. The first input shaft 260 and the second input shaft 270 may be classified as an apply shaft and a release shaft, depending on engagement with a clutch 220. The apply shaft is an input shaft to be engaged with the clutch 220, and the release shaft is an input shaft to be disengaged from the clutch 220.

The torque phase in a dual clutch means a shifting process in which a torque of a first clutch 265 engaged with an apply shaft of the transmission 240 increases and a torque of a second clutch 275 engaged with a release shaft decreases.

On the other hand, when the second determining step (S150) determines that the transmission 240 has entered a torque phase, the calculating step (S200) calculates a compensatory torque for compensating for a change in regenerative braking force due to a change in gear ratio in accordance with a completion percentage of a torque phase.

As the torque phase progresses, influence on torque transmission by the gear ratios at the input shafts changes, and thus, the regenerative braking force transmitted to the output shaft 280 may continuously change in accordance with the completion percentage of the torque phase even when the regenerative torque of the motor 400 is maintained.

Here, the regenerative torque means a torque consumed by the motor 400 for regenerative braking, and the regenerative braking force means a braking force generated by the output shaft 280 of the transmission due to the regenerative torque.

That is, when down-shift is made during regenerative braking even with the regenerative torque of the motor 400 maintained, the regenerative braking force transmitted to the output shaft 280 of the transmission is changed by a change in gear ratio, and thus, braking linearity of the vehicle may be lost.

Accordingly, a compensatory torque for maintaining braking force at a predetermined level is calculated by continuously determining changes in the regenerative braking force according to the completion percentage of a torque phase.

The compensating step (S250) compensates for the regenerative torque of the motor 400 by applying the compensatory torque calculated in the calculating step (S200).

The calculating step (S200) continuously calculates compensatory torque in accordance with the completion percentage of a torque phase, and therefore, it is possible to reduce a change in regenerative braking force due to shifting by compensating for the regenerative torque using the compensatory torque.

Accordingly, it is possible to continuously and efficiently satisfy the braking linearity in accordance with the completion percentage of a torque phase during shifting by compensating for the regenerative torque of the motor 400 with the compensatory torque.

In the control method according to the present disclosure, the compensatory torque calculated in the calculating step (S200) is obtained from a difference between an output torque of the output shaft 280 and the regenerative braking force transmitted to the output shaft 280 of the transmission due to the regenerative torque.

There needs a standard for calculating compensatory torque in order to calculate a compensatory torque for compensating for regenerative torque, and the compensatory torque can be obtained from the difference between regenerative braking force transmitted to the output shaft 280 from the generative torque of the motor 400 and the output torque from the output shaft 280. This is expressed by the following equation (1).

$$T_B + T_O = T_C, \quad (1)$$

where $T_B$ is a regenerative braking force transmitted to the output shaft 280 due to regenerative torque of the motor 400, $T_O$ is an output torque of the output shaft 280, and $T_C$ is a compensatory torque.

In particular, in calculation of compensatory torque as in equation (1), it is advantageous to calculate a change in regenerative braking force on the basis of the output torque for improving the braking linearity, because it is possible to continuously calculate the compensatory torque in a torque phase.

For example, although it is possible to set in advance a change ratio of regenerative torque experimentally or theoretically determined in order to maintain braking linearity in a shifting process, it is difficult to maintain the braking linearity according to various pedal efforts and driving conditions.

Consequently, the braking linearity can be maintained in the torque phase by calculating the compensatory torque on the basis of the difference between regenerative braking force and the output torque that can be continuously calculated.

In the control method according to the present disclosure, the output torque in the calculating step (S200) is calculated on the basis of the torque from the first input shaft 260, the torque from the second input shaft 270, the torque from a first clutch 265 engaged with the first input shaft 260, the torque from a second clutch 275 engaged with the second input shaft 270, the gear ratio between the first input shaft 260 and the second input shaft 270, and the completion percentage of the torque phase.

A clutch torque means a torque applied to a clutch disc which is connected to an input shaft. A first clutch torque means a torque applied to the first clutch disc 265 which is connected to the first input shaft 260. A second clutch torque means a torque applied to a second clutch disc 275 which is connected to the second input shaft 270.

The output torque is a sum of the torque from the first input shaft 260 and the second input shaft 270 that are connected to the output shaft 280, and is expressed as the following equation (2).

$$T_O = A^* T_{AP} + B^* T_{RE}, \quad (2)$$

where A is a gear ratio of an apply shaft, B is a gear ratio of a release shaft, $T_{AP}$ is a torque from the apply shaft, and $T_{RE}$ is a torque from the release shaft.

In equation (2), $T_{AP}$ and $T_{RE}$ are values obtained respectively by subtracting the torque calculated from a rotational speed and an inertial moment of the input shafts from the torque of the clutch which is engaged with the input shaft, and are expressed as the following equation (3).

$$T_{AP} = T_{CL1} - (I_{CL1} + I_{AP})^* W'_{CL1}, T_{RE} = T_{CL2} - (I_{CL2} + I_{RE})^* W'_{CL2} \quad (3)$$

substituting (3) for equation (3) for output torque, $$T_O = A^* F^* [T_{CL1} - (I_{CL1} + I_{AP})^* W'_{CL1}] + B^* (1-F)^* [T_{CL2} (I_{CL2} + I_{RE})^* W'_{CL2}], \quad (4)$$

where F is a completion percentage of a torque phase, $T_{CL1}$ is a first clutch torque, $T_{CL2}$ is a second clutch torque, and $I_{CL1}$ and $I_{CL2}$ are inertial moments of the first clutch disc 265 and the second clutch disc 275, respectively. Further, $I_{AP}$ and $I_{RE}$ are inertial moments of the apply shaft and a release shaft, respectively, and $W'_{CL1}$ and $W'_{CL2}$ are the angular speeds of the first clutch disc 265 and the second clutch disc 275.

The completion percentage of the torque phase can be considered in calculation of output torque, as in the above equations because an influence on the output torque by the apply shaft and the release shaft changes, as the torque phase progresses.

Accuracy of the calculated output torque may be effectively improved by calculating the torque from the input shafts of the transmission 240 in consideration of the gear ratios and the completion percentages of the torque phase, and the output torque may be continuously calculated while the torque phase progresses.

In the control method according the present disclosure, the torque of the motor 400 and the torque of the output shaft 280 of the transmission 240 are converted into each other on the basis of the gear ratio and transmission efficiency of the first input shaft 260 and the second input shaft 270.

That is, when the torque of the motor 400 and the output shaft 280 of the transmission 240 are converted into each other, the transmission efficiency should be considered. Here, the transmission efficiency means a transmission ratio of torque generated by a power source and then transmitted to the output shaft 280.

The apply shaft and the release shaft should be considered in converting the torque of the motor 400 and the output shaft 280 into each other. Particularly, most torque is transmitted through the apply shaft throughout the torque phase, so an equation for converting torque can be simply arranged as the following equation (5).

$$T_M = T_O / (A^* N), \quad (5)$$

where $T_M$ is a torque of the motor 400, $T_O$ is a torque of the output shaft 280, A is a gear ratio of the apply shaft, and N is a transmission efficiency.

Th above torque conversion equation is applied to conversion of compensatory torque, which is expressed as the following equation (6).

$$T_{C'} = T_C / (A^* N), \quad (6)$$

where $T_R$ is a regenerative torque of the motor 400, and $T_{C'}$ is a torque value converted for the motor 400 from the compensatory torque.

As a result, it is possible to compensate for regenerative torque by efficiently and simply setting a process of converting the compensatory torque into the torque of the output shaft 280, using equation (6).

The control method of the present disclosure further includes a third determining step (S300) that determines whether the transmission 240 has entered an inertia phase, after the compensating step (S250).

In detail, in a dual clutch transmission for a hybrid electric vehicle, the first input shaft 260 and the second input shaft 270 are divided into an apply shaft and a release shaft, respectively. When a torque phase is finished, an inertia phase that synchronizes a rotational speed of the motor 400 with a rotational speed of the apply shaft starts.

Figure 3:
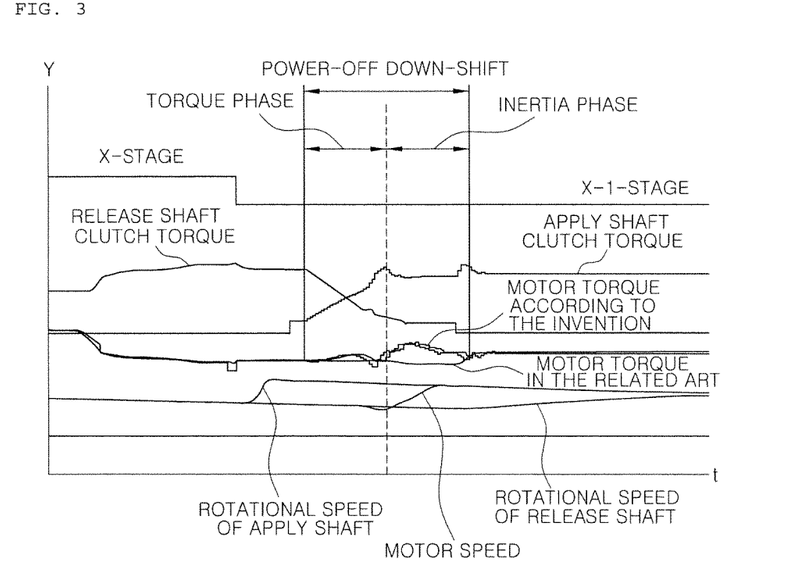
FIG. 3 is a graph illustrating a shifting state by a method of controlling a dual clutch transmission for a hybrid electric vehicle according to an embodiment in the present disclosure.

That is, the third step (S300) determines whether an inertia phase has been entered after a torque phase, with the torque phase finished, that is, the compensating step (S250) finished. The inertia phase refers to a step of synchronizing the rotational speed of the motor 400 with the rotational speed of an apply shaft, after the process of converting the torque of input shafts is finished. A change in rotational speed of the motor is shown in the graph of FIG. 3.

The control method of the present disclosure further includes a motor torque control step (S350) that controls the motor 400 with a motor torque calculated by applying a slip change rate according to the completion percentage of an inertia phase, when the third determining step (S300) determines that the transmission 240 has entered the inertia phase.

When a shifting process enters an inertia phase, the rotational speed of the motor 400 increases to be synchronized with the rotational speed of the apply shaft, in which it is required to increase the motor torque which is applied to the motor 400 in order to increase the rotational speed of the motor 400.

The motor torque is indirectly adjusted by adjusting the regenerative torque of the motor 400.

However, in order to continuously and smoothly increase the rotational speed of the motor 400 with an increase of the motor torque, the motor torque should be controlled, which may be in association with the slip change rate of the clutch 220 by the apply shaft.

Accordingly, it is possible to determine in advance a slip change rate of the clutch 220 in order to determine a motor torque for continuously and smoothly increasing the rotational speed of the motor 400, and it is possible to calculate the motor torque for controlling the motor, using the slip change rate determined in this way.

That is, by inputting the slip change rate determined to continuously increase the rotational speed of the motor 400 in a hybrid controller 340 and then controlling the motor 400 with the motor torque, which is calculated on the basis of the input value, shifting response in an inertia phase can be improved. The resultant change in motor torque is shown as a graph in FIG. 3.

According to the control method of a dual clutch transmission for a hybrid electric vehicle of an embodiment in the present disclosure, in the motor torque control step (S350), the motor torque can be calculated from the torque from the first clutch 265, the torque from the second clutch 275, the slip change rate, and a rotational speed change rate of the input shaft where the motor 400 is synchronized.

It is possible to determine the motor torque, using the slip change rate of the clutch 200 in order to improve shifting response in the inertia phase, and the motor torque can be determined on the basis of the torque of the clutches and the relationship between the slip change rate and the rotational speed change rate of the apply shaft that is the input shaft to be synchronized with the motor 400.

A way of determining motor torque is as the following equation (7).

$$T_M = (I_M + I_{DC}) * \left(\frac{dSLIP}{dt} + \frac{dN_{AP}}{dt}\right) + T_{CL1} + T_{CL2}, \quad (7)$$

where $$\frac{dSLIP}{dt}$$

is a slip change rate of the clutch 220 and $$\frac{dN_{AP}}{dt}$$

is a rotational speed change rate of the apply shaft.

In accordance with this expansion, equation (7) showing the relationship between the slip change rate and motor torque is obtained, and other variables are fixed constants or actually measured values, except for the slip change rate in equation (7).

The torque mode is determined by introducing the slip change rate determined in advance to continuously and smoothly increase the rotational speed of the motor 400 in an inertia phase into equation (7).

The slip change rate is a value that is experimentally theoretically determined in advance. A motor torque, while an inertia phase progresses, is modeled by introducing a slip change rate corresponding to the current amount of slip in predetermined rates of change of slip into equation (7).

As a result, by determining a motor torque model for smoothly increasing the rotational speed of the motor 400 in accordance with various shifting conditions on the basis of the amount of slip while an inertia phase progresses according to equation (7) and by controlling the motor 400 on the basis of the motor torque model, shifting response can be maximized.

Referring to FIGS. 1 to 3, in the motor torque control step (S350), when the rotational speed of the motor 400 is equal to the rotational speed of the input shaft to be synchronized with the motor 400, the control of motor torque stops.

When the rotational speed of the motor 400 is equal to the rotational speed of the apply shaft, slip is not generated and it may be considered that the inertia phase has finished. Accordingly, power-off down-shift is considered as being finished, so that the control of motor torque for the power-off down-shift stops and the motor 400 can return to have an initial motor torque for regenerative braking. For this, FIG. 1 may be referred in consideration of entire changes in torque and rotational speed.

According to the control method of the present disclosure, it is determined whether a vehicle has entered a power-off down-shift state, it is determined whether the transmission 240 has entered a torque phase, a compensatory torque is calculated, and a regenerative torque of the motor 400 is compensated by the hybrid controller 340.

In detail, the transmission controller 320 is connected with the first input shaft 260, the second input shaft 270, and the hybrid controller 340, so that the transmission controller 320 may check information such as a shifting state and a rotational speed of input shafts and determines the degree of shifting.

The hybrid controller 340 is connected with the motor 400 and the transmission controller 320, so that the hybrid controller 340 may determine a regenerative torque and a motor torque and perform control for compensating the regenerative torque in accordance with information from the transmission controller 320.

A control system of a dual clutch transmission for a hybrid electric vehicle according to another embodiment includes: a transmission 240 including a first input shaft 260, a second input shaft 270, and an output shaft 280; a motor 400 selectively connected to clutches 265 and 275 engaged with the first input shaft 260 and the second input shaft 270, respectively, of the transmission 240; a transmission controller 320 determining whether a vehicle has entered a power-off down-shift state, determining whether the transmission 240 has entered a torque phase, and calculating compensatory torque for compensating for a change in regenerative torque due to a gear ratio changed by the power-off down-shift state, in accordance with a completion percentage of the torque phase; and a hybrid controller 340 compensating for the regenerative torque by applying the compensatory torque.

The transmission 240 may be a dual clutch transmission and includes the first input shaft 260, the second input shaft 270, and the output shaft 280. The transmission 240 is connected to the motor 400 through the clutch 220.

The transmission controller 320 is connected with the first input shaft 260, the second input shaft 270, and the hybrid controller 340, thus checking information such as a shifting state and a rotational speed of input shafts and determines the degree of shifting.

The hybrid controller 340 is connected with the motor 400 and the transmission controller 320, thus determining regenerative torque and motor torque and performing control for compensating regenerative torque in accordance with information from the transmission controller 320.

Although exemplary embodiments in the present inventive concept has been described for illustrative purposes, those skilled in the art will appreciate that various modifications, additions, and substitutions are possible, without departing from the scope and spirit of the invention as disclosed in the accompanying claims.

What is claimed is:

1. A control method of a dual clutch transmission for a hybrid electric vehicle, the method comprising:
    a first determining step of determining, by a transmission controller, whether the vehicle has entered a power-off down-shift state;
    a second determining step of determining, by the transmission controller, whether the transmission including a first input shaft, a second input shaft, and an output shaft has entered a torque phase, when the first determining step determines that the vehicle has entered the power-off down-shift state;
    a calculating step of calculating, by a hybrid controller, a compensatory torque for compensating for a change in a regenerative braking force according to a change of a gear ratio in accordance with a completion percentage of the torque phase, when the second determining step determines that the transmission has entered the torque phase; and
    a compensating step of compensating for, by the hybrid controller, a regenerative torque of a motor by applying the compensatory torque calculated in the calculating step,
    wherein the compensatory torque calculated in the calculating step is obtained from a difference between an output torque of the output shaft and the regenerative braking force transmitted to the output shaft due to the regenerative torque of the motor, and
    wherein the output torque of the output shaft in the calculating step is calculated based on a first torque from the first input shaft, a second torque from the second input shaft, a third torque from a first clutch which is engaged with the first input shaft, a fourth torque from a second clutch which is engaged with the second input shaft, gear ratios of the first input shaft and the second input shaft, and the completion percentage of the torque phase.

2. The method of claim 1, wherein a torque of the motor and a torque of the output shaft of the transmission are converted into each other based on the gear ratio and a transmission efficiency of each of the first input shaft and the second input shaft.

3. The method of claim 1, further comprising:
    a third determining step of determining whether the transmission has entered an inertia phase, after the compensating step.

4. The method of claim 3, further comprising:
    a motor torque control step of controlling the motor with a motor torque calculated by applying a slip change rate according to a completion percentage of the inertia phase, when the third determining step determines that the transmission has entered the inertia phase.

5. The method of claim 4, wherein in the motor torque control step, the motor torque is calculated from a third torque from a first clutch, a fourth torque from a second clutch, a slip change rate, and a rotational speed change rate of an input shaft with which the motor is synchronized among the first and second input shafts.

6. The method of claim 4, wherein in the motor torque control step, when a rotational speed of the motor is equal to a rotational speed of the input shaft that is synchronized with the motor, the control of motor torque stops.

7. The method of claim 1, wherein whether the vehicle has entered the power-off down-shift state is determined, whether the transmission has entered the torque phase is determined, the compensatory torque is calculated, and the regenerative torque of the motor is compensated by the hybrid controller.

8. The method of claim 1, wherein the compensatory torque the compensatory torque are calculated continuously according to the completion percentage of the torque phase.

9. A control system of a dual clutch transmission for a hybrid electric vehicle, comprising:
    a transmission including a first input shaft, a second input shaft, and an output shaft which connected to the first input shaft and the second input shaft;
    a motor selectively connected to clutches which are engaged with the first input shaft and the second input shaft, respectively;
    a transmission controller configured to determine whether the vehicle has entered a power-off down-shift state, to determine whether the transmission has entered a torque phase, and to calculate a compensatory torque for compensating for a change in a regenerative torque due to a gear ratio changed by the power-off down-shift, in accordance with a completion percentage of the torque phase; and
    a hybrid controller configured to compensate for the regenerative torque by applying the compensatory torque,
    wherein the compensatory torque calculated in the calculating step is obtained from a difference between an output torque of the output shaft and the regenerative braking force transmitted to the output shaft due to the regenerative torque of the motor, and
    wherein the output torque of the output shaft in the calculating step is calculated based on a first torque from the first input shaft, a second torque from the second input shaft, a third torque from a first clutch which is engaged with the first input shaft, a fourth torque from a second clutch which is engaged with the second input shaft, gear ratios of the first input shaft and the second input shaft, and the completion percentage of the torque phase.

10. The system of claim 9, wherein the transmission controller is connected with the first input shaft, the second input shaft, and the hybrid controller and checks a shifting state and rotational speeds of the input shafts.

11. The system of claim 9, wherein the hybrid controller is connected with the motor and determines the regenerative torque and a motor torque.

* * * * *